UNITED STATES PATENT OFFICE.

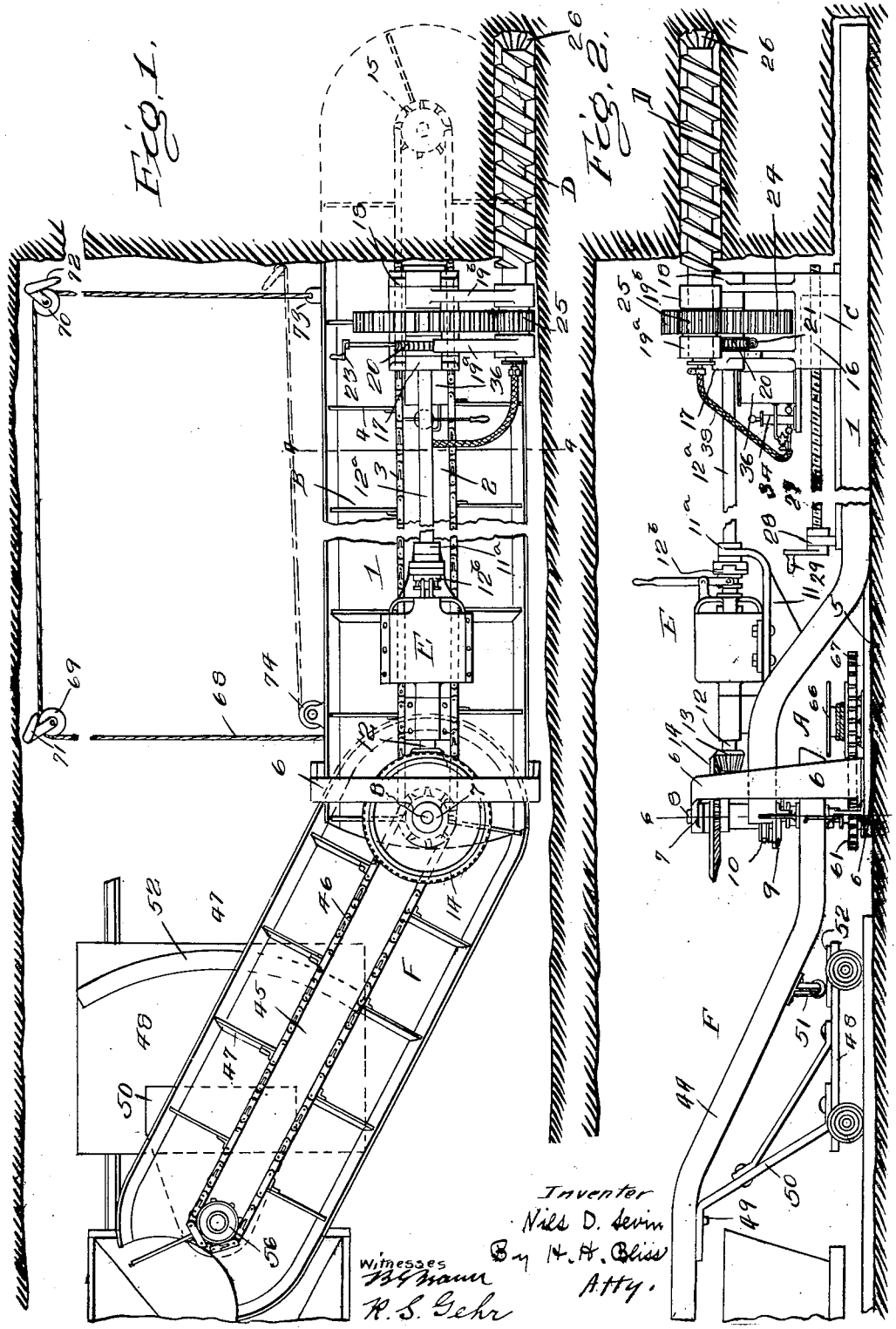

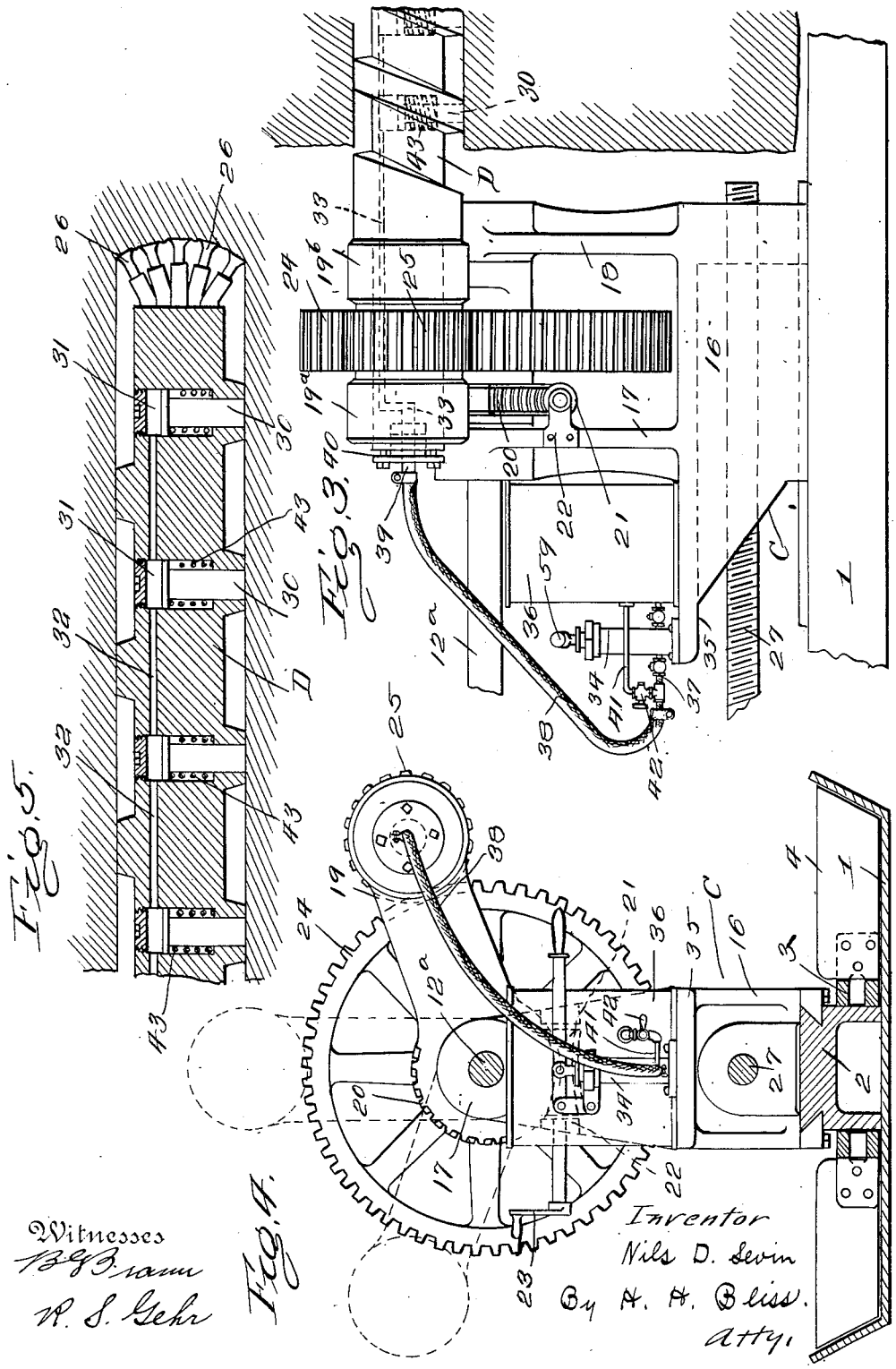

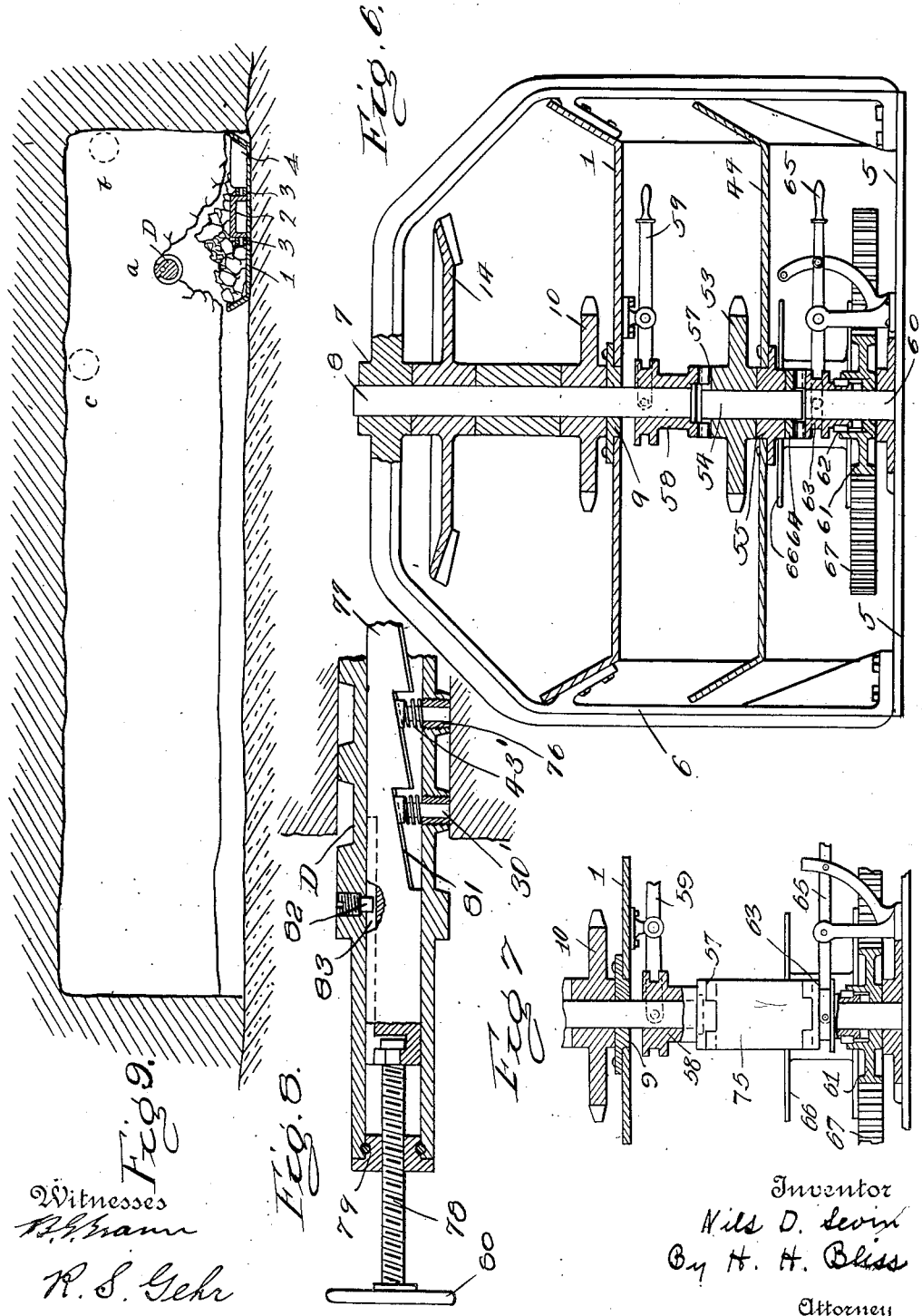

NILS D. LEVIN, OF COLUMBUS, OHIO, ASSIGNOR TO THE JEFFREY MANUFACTURING COMPANY, A CORPORATION OF OHIO.

MINING AND LOADING MACHINE.

1,319,156. Specification of Letters Patent. Patented Oct. 21, 1919.

Application filed October 22, 1910, Serial No. 588,471. Renewed January 13, 1917. Serial No. 142,324.

*To all whom it may concern:*

Be it known that I, NILS D. LEVIN, a citizen of the United States, residing at Columbus, in the county of Franklin and State of Ohio, have invented certain new and useful Improvements in Mining and Loading Machines, of which the following is a specification, reference being had therein to the accompanying drawing.

This invention relates to devices for breaking down coal previously undercut and loading it into cars for removal from the mines. The object of the invention is to provide devices of this character capable of handling the coal in the manner stated effectively and with the greatest possible degree of economy. The nature of the invention will be set forth in detail in connection with the accompanying drawings, in which—

Figure 1 is a plan view of a machine embodying my invention, a portion of the machine being broken away to permit illustration on a larger scale than would otherwise be possible.

Fig. 2 is a side elevation of the machine.

Fig. 3 is a fragmentary side elevation showing the moving carriage upon which the drill or auger is mounted.

Fig. 4 is a vertical section on the line 4—4 of Fig. 1.

Fig. 5 is a vertical longitudinal section through a portion of the auger showing the hydraulic plungers mounted therein.

Fig. 6 is a transverse vertical section taken on the line 6—6 of Fig. 2.

Fig. 7 is a vertical section in the same plane as Fig. 6 showing a removable shaft section which is used at times in connection with the machine.

Fig. 8 is a vertical longitudinal section of a part of the auger showing a modification of the coal breaking devices.

Fig. 9 is a diagrammatic view of the face of the coal showing the manner in which the auger is driven into the coal to break it down.

Referring in detail to the construction, A is the main frame of the machine; B is an endless conveyer mounted thereon; C is a carriage slidably mounted on the frame A; D is an auger adjustably mounted on the carriage C; E is a motor adapted to drive the auger and the conveyer B, and F is an auxiliary conveyer adapted to receive coal from the conveyer B and discharge it into the cars.

The main frame A consists of a horizontally extending pan-like structure 1 having a central longitudinally extending rib member 2 which divides the pan into two parallel troughs. In these troughs are disposed the moving parts of the conveyer B which latter consists of a chain 3 carrying suitably spaced vanes or flights 4. The rib part 2 serves as a guide for the conveyer chain. This chain preferably has its pivot joints alternately at right angles to each other, as indicated in Fig. 1, so that the chain is universally flexible. This is necessary, because the rear part of the main frame A is inclined upward and rearward as shown in Fig. 2.

The main frame A has a plate-like extension 5 which underlies the upwardly inclined portion of the frame. A yoke 6 which is mounted on the plate or base 5 extends upward and over the main part of the frame 1 to which it is rigidly attached. On the upper end of the yoke is formed a bearing 7 for the vertical shaft 8, and the lower part of this shaft has a bearing 9 carried by the frame part 1. 10 is a sprocket wheel fast on the shaft 8 which drives the conveyer chain 3, the shaft being driven by the motor E. This motor is mounted upon a bracket 11 carried by the inclined part of the main frame A, the shaft 12 of said motor having a bevel pinion 13 which meshes with the bevel gear 14 on the shaft 8. The endless conveyer at its front end passes over a sprocket wheel 15 which is suitably mounted on the frame A.

The carriage C consists of a base part 16 which is slidably mounted upon the rib 2 of the frame (see Fig. 4), and upstanding bearing arms or pedestals 17, 18. The motor shaft 12 has a forward extending section 12ª. The rear end of the shaft section 12ª is supported by a bearing bracket 11ª and is connected by a disengageable clutch device 12ᵇ to the motor shaft 12. The front end of the shaft 12ª is disposed in the bearings of the pedestals 17, 18. Disposed between the pedestals 17 and 18 and mounted upon the shaft 12ª is a swinging yoke or radius arm 19. The rear branch or arm 19ª of this yoke is formed at its inner end with a segmental worm wheel 20. 21 is a worm which is mounted in a bearing bracket 22 secured to the rear pedestal 17 of the carriage. This worm meshes with the segmental worm wheel 20 and can be turned by means of a crank 23 to cause the yoke 19 to swing about its axis, it being understood that the shaft 12ª turns freely in the yoke.

The auger D is rotatably mounted in the free ends of the yoke arms 19ª, 19ᵇ, and is driven by the large spur gear 24 which is slidably keyed on the shaft 12ª and which meshes with a spur pinion 25 secured to the shaft of the auger D. The auger in its preferred form carries cutting tools 26, 26 at its front end. It will be seen that with the auger mounted in the manner shown and described, it is possible to drive it from the motor in any one of a variety of positions in which it may be placed by swinging the yoke 19 through something over 180°. The carriage C upon which the auger is mounted is, as it was stated, slidably mounted upon the main frame, and a screw 27 which is mounted at its rear end in a bearing 28 and which at its forward end is threaded through the base of the carriage, serves to move the carriage backward and forward on the main frame, a hand crank 29 being provided to turn the screw.

The auger D is provided with means for breaking the coal down after the auger has been driven into the coal. A preferred form of the breaking means is shown in the drawing. A series of hydraulic plungers 30, 30 are mounted in cylindrical cavities 31, 31 formed in the auger, the cylinders and plungers being disposed transversely of the auger and in one axial plane thereof. The cylindrical cavities 31, 31 communicate with each other through passages 32, 32, and the rearmost cavity of the auger is in communication with the passage 33 which leads to the rear end of the auger shaft where it issues axially. 34 is a hand force pump which is mounted upon a bracket 35 of the carriage C. This pump has its suction passage in communication with a reservoir 36 which contains a supply of water or other suitable liquid. The discharge pipe 37 of the pump is connected to a hose 38 which in turn is connected to the passage 33 of the auger, the hose being provided at its discharge end with a nozzle 39 which extends through a suitable stuffing box 40. 41 is a by-pass pipe leading from the discharge pipe 37 of the pump into the reservoir 36. The by-pass is controlled by a hand actuated control valve 42.

When the pump is actuated, the by-pass 41 being closed, the liquid is forced through the hose 38 and passages 33, 32 into the cylinders 31 and causes the plungers 30 to be forced outward. A spring 43 is mounted under the head of each of the plungers 30 and serves to retract the plunger when the liquid pressure is withdrawn, which is done by opening the valve 42 in the by-pass 41 so that the liquid can flow freely back into the reservoir 36.

It will be seen that after the auger has been driven forward into the coal, as shown in Figs. 1 and 2, the hydraulic pressure can be applied to the plungers mounted in the auger to break down the underlying coal upon the endless conveyer which extends into the bottom kerf, it being understood that said bottom kerf is previously cut by any of the well known undercutting devices. The coal thus broken down is carried rearward by the endless conveyer B, and in order that it may be discharged into cars without manual labor, I provide the auxiliary conveyer F.

The conveyer F comprises a main frame part 44 in the form of an elongated pan which is divided by a central longitudinal rib part 45 into two parallel troughs to receive the moving parts of the conveyer which, as shown, comprises a chain 46 and flights 47. The conveyer frame 44 has its front and rear end parts horizontal with an intermediate inclined part. It is supported upon a truck 48, the rear end of the conveyer frame 44 being provided with a depending pivot pin 49 which extends loosely through an aperture in the upper end of a bracket 50 on the truck. The frame 44 carries on its under side a wheel 51 which is designed to run upon an arcuate plate 52 on the truck platform. Thus mounted on the truck, the frame can be swung through a considerable range about the pivot 49.

In operation the conveyer F has its receiving end disposed beneath the rear end of the conveyer B, and preferably the conveyer F is driven from the motor E which drives the conveyer B. 53 is the driving sprocket wheel on the conveyer F, it being mounted on a short shaft 54 which is mounted in a suitable bearing 55 carried by the pan 44 of the conveyer. (See Fig. 6.) An idle sprocket wheel 56 for the conveyer chain 46 is mounted in a similar manner at the rear end of the conveyer F. The upper face of the sprocket wheel 53 is formed with clutch teeth 57 which are adapted to be engaged by the teeth of a sliding clutch 58 which is slidably connected upon the lower end of the shaft 8 and which can be raised and lowered by a hand lever 59. When the receiving end of the conveyer F has been moved under the discharge end of the conveyer B, the driving sprocket 53 of the former conveyer can be operatively connected to the shaft 8 of the conveyer B, by simply lowering the clutch 58. In this way too the two conveyers are pivotally or flexibly connected to each other, and as the truck 48 is free to move on the track, it will be seen that the conveyer F will be automatically maintained in working relation with the main frame A of the machine when the latter is moved laterally along the face of the coal.

To effect the lateral movement of the machine along the face, I provide suitable power devices as follows:

On the base part 5 of the main frame A is mounted a stud shaft 60 upon which is rotatably mounted a spur gear 61. This gear has on its upper side clutch teeth 62 which are at all times in engagement with the teeth of a sliding clutch 63. 64 is a toothed clutch disk fast on the lower end of the shaft 54 of conveyer F, and by sliding the clutch 63 upward into engagement with the disk 64, the latter is connected to the gear 61. 65 is a suitably mounted hand lever designed to shift the clutch 63. 66 is a winding drum arranged to turn about a vertical axis, and 67 is a large spur gear connected to said drum and mounted in mesh with the gear 61. One end of the cable 68 is secured to the winding drum 66 and thence extends to the left parallel to the face, passes over pulleys 69 and 70 which are anchored in any suitable manner by jacks or props 71, 72, and thence passes along the face of the coal to the machine, being made fast at 73 to the main frame A. It will be seen that when the clutch 63 is thrown to operative position, the winding drum 66 is turned causing the cable to be wound up and the machine to be drawn laterally along the face of the coal. Furthermore, the construction and arrangement of these devices is such that they are adapted to move the main frame laterally in parallelism so that it is maintained at the same angle to the coal face. 74 is a pulley mounted on the base 5 at the left side of the machine, and is adapted to have the cable 68 passed over it and extended forward to a point adjacent the face of the coal and there made fast when it is desired to move the machine endwise into the bottom kerf.

It is at times desirable to drive the winding drum 66 when the conveyer F is not in operative position. To make this possible, I provide a short shaft section 75 which is shown in Fig. 7. This shaft is designed to be inserted between the movable clutch members 58 and 63 and is formed at its ends with teeth to engage the teeth of said clutch members. By inserting the shaft section 75, the gear 61 can be connected to the shaft 8 and driven from the motor E.

In Fig. 8 I have shown a modified form of the breaking down devices carried by the auger. Referring to this modification, it will be observed that plungers 30' are mounted in sleeves 76 threaded into the body of the auger D' and springs 43' are interposed between the heads of the plungers and the sleeves, the relative arrangement of parts being much the same as in the hydraulic construction heretofore described and shown in Fig. 5. In the present case the plungers are thrust outward by means of a bar 77 which is slidably mounted in the auger D' and provided with cams 81 which slidably engage the heads of the plungers 30'. The cam bar 77 is moved endwise by means of a screw 78 which is threaded through a block 79 carried by the auger, has a swivel connection at one end with the cam bar 77 and is provided at its other end with a hand wheel 80. The cam bar 79 is held against rotation about its longitudinal axis by means of a screw 82 which engages longitudinal slot 83 in the cam bar. It will be seen that when the cam bar is forced inward by rotation of the cam wheel 80, the plungers 30' are forced radially outward to break down the coal, and when the cam bar is moved in the opposite direction the plungers are retracted by the springs 43'.

The modified form of breaker in Fig. 8, just described, as will be readily understood, is mounted in the way above set forth; that is to say, the cylindrical rear end part is mounted in the yoke bearings 19$^a$, 19$^b$, the wedge or cam operating screw 78 being accessible at the rear as are the parts constituting the hydraulic apparatus.

The operation of the machine will be readily understood from the foregoing description. Assuming for the purpose of illustration, that the machine is to be used in a room and pillar mine, the procedure is as follows:

The coal having been undercut by any desired means, my breaking down and loading machine is set down adjacent the face of the coal, preferably at one of the ribs. In Fig. 1 I have shown the machine disposed in the corner of the room formed by the face and the right rib. The carriage C being fully retracted, the cable 68 is passed over the pulley 74 and carried forward along the side of the machine, as indicated by dotted lines in Fig. 1, and made fast at a point adjacent the face. The movable shaft section 75 having been placed in position between the clutches 58 and 63, the motor is now started so as to turn the winding drum 66 and draw the machine endwise toward the face of the coal. When the front end of the main frame A and the conveyer B have been projected fully into the bottom kerf of the coal, the motor is stopped, the shaft section 75 removed, and the conveyer F is run into operative position and connected by means of the clutch 58 with the shaft 8 of the conveyer B.

The yoke which carries the auger D is then swung over to the left by actuating the crank 23 until it approaches a horizontal position, as shown by dotted lines in Fig. 4.

This brings the auger about into the position corresponding to the circle a in Fig. 9. The motor is now started so as to rotate the auger D, and the carriage is gradually fed forward by turning the screw 27.

The auger having been driven fully into the coal in this manner, the clutch 12$^b$ is disengaged so as to stop the auger with the hydraulic plungers 30 facing downward. The pump 34 is now actuated so as to force liquid into the plunger chambers, and the plungers 30 are forced downward, the auger reacting upward against the overlying coal or rock. The downward pressure of the plungers causes a portion of the coal underlying the auger to be broken down in the manner indicated in Fig. 9 of the drawing. The coal thus loosened falls upon the conveyer B which carries it to the rear and discharges it into the conveyer F which in turn discharges it into a mine car, the coal having been forced down, the operator retracts the hydraulic plungers by opening the by-pass valve 42.

The carriage C is now retracted by turning the screw 27 and the auger is then swung over to the right to a position preferably somewhat above that shown in full lines in Fig. 4, and indicated by the circle b in Fig. 9. The clutch 12$^b$ is now thrown into operative position, the auger again fed forward, and the coal broken down and loaded into the car in the manner just described.

The carriage having again been retracted, the pulley blocks 69 and 70 are made fast at suitable points to the left of the machine, and the cable 68 is passed around the pulleys 69 and 70 and thence back to the machine to which it is made fast at 73. The winding drum 66 is now started by throwing in the clutch 63, and the cable is thus wound up until the machine is drawn far enough to the left to make additional cuts with the auger. Preferably the machine will be moved far enough so that the auger, when swung to an upright position, will occupy the position indicated by the circle c in Fig. 9. With the auger in this position, the carriage is again fed forward and the operation of drilling, breaking down and loading is repeated as before. In this manner the work is continued until the machine has been moved clear across the face. During the progress of the machine along the face, the auxiliary conveyer F is gradually swung about its pivotal support 49, remaining constantly in operative relation with the main part of the machine and with the cars on the track.

While I have shown a preferred form of my invention, it should be understood that some of the parts can be modified without affecting the operation of other parts, and that some of the features are useful independently.

I relate the claims herein to a specific form of means for making openings or incisions in the coal, and to carry the pressure-exerting devices for breaking the coal down, that specific form being an auger which advances longitudinally while cutting the openings or incisions. Claims relating more broadly to the matter of forming incisions or openings to provide clearance for the coal and to receive the pressure devices, and not limited to such an auger are presented in my application Ser. No. 160,516, filed April 7, 1917; preferring to restrict myself herein to the said special incision forming device.

Nor do I herein claim any of the features of novelty incident to the conveyer apparatus. I have filed an application Ser. No. 220,818, on March 6, 1918, relating to the conveying apparatus and have illustrated therein a mechanism similar to that here presented in order that one method of using such conveyer may be readily understood.

What I claim is:—

1. In a coal mining machine, the combination of an auger, means for advancing the auger into the coal, breaking down devices carried by the auger and movable along lines perpendicular to the axis of the auger, and means positioned within the outlines of the auger for actuating the said breaking down devices, substantially as set forth.

2. In a coal mining machine, the combination of an auger, means for advancing the auger into the coal, breaking down devices carried by the auger and movable with respect thereto along lines perpendicular to the axis thereof, means positioned within the outlines of the auger for actuating the said breaking down devices, and power transmitting means connecting the said actuating means with a non-rotary part of the mining machine, substantially as set forth.

3. In a coal mining machine, the combination of an auger, means for advancing the auger into the coal, breaking down devices carried by the auger and movable with respect thereto along lines perpendicular to the axis thereof, means positioned within the outlines of the auger and rotatable therewith for actuating the said breaking down devices, and mechanism for controlling the said actuating devices, the said mechanism being operable for all positions of the said actuating means, substantially as set forth.

4. In a coal mining machine, the combination of an auger having cutting devices at its forward end and a spiral rib extending from the forward end to the rear end, means for advancing the auger into the coal, a plurality of radially disposed breaking down devices mounted in the said spiral rib and adapted to normally lie within the outlines thereof, and means inside of the auger for actuating the said breaking down devices, substantially as set forth.

5. In a coal mining machine, the combination of an auger having cutting devices at its forward end and a spiral rib extending from the forward end to the rear end, the periphery of the rib lying in the cylindrical surface determined by the path of the outer edge parts of the cutting devices, means for advancing the auger into the coal, a plurality of radially disposed breaking down devices mounted in the said spiral rib and adapted to normally lie within the outlines thereof, and means inside of the auger for actuating the said breaking down devices, substantially as set forth.

6. In a coal mining machine, the combination of a frame, an auger, a support for the auger mounted on the frame, said support being adjustable to move the auger to different heights and to adjust it laterally, means for advancing the auger into the coal, and coal breaking down means carried by the auger and movable with respect thereto along lines perpendicular to the axis thereof, substantially as set forth.

In testimony whereof I affix my signature, in presence of two witnesses.

NILS D. LEVIN.

Witnesses:
E. P. SNIVELY,
C. E. WAXBOM.